(12) United States Patent
Juang

(10) Patent No.: US 8,014,816 B2
(45) Date of Patent: Sep. 6, 2011

(54) MOBILE COMMUNICATION DEVICE AND POWER SAVING METHOD THEREOF

(75) Inventor: Jr-Fu Juang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 742 days.

(21) Appl. No.: 12/104,456

(22) Filed: Apr. 17, 2008

(65) Prior Publication Data

US 2008/0261646 A1    Oct. 23, 2008

(30) Foreign Application Priority Data

Apr. 20, 2007   (CN) .......................... 2007 1 0200487

(51) Int. Cl.
*H04M 1/00*    (2006.01)

(52) U.S. Cl. .................... 455/550.1; 455/74; 455/414.4; 455/574

(58) Field of Classification Search ............ 455/74, 455/414.4, 550.1, 574
See application file for complete search history.

(56) References Cited

U.S. PATENT DOCUMENTS

| 6,085,072 A * | 7/2000 | Komiya .......................... 455/83 |
| 7,089,032 B2 | 8/2006 | Hongo et al. |
| 2006/0212617 A1* | 9/2006 | Horio et al. ...................... 710/52 |
| 2006/0240798 A1* | 10/2006 | Jarosinski et al. .......... 455/343.1 |

FOREIGN PATENT DOCUMENTS

| CN | 1165461 A | 11/1997 |
| CN | 1336752 A | 2/2002 |
| CN | 1490990 A | 4/2004 |

* cited by examiner

*Primary Examiner* — Tuan H Nguyen
(74) *Attorney, Agent, or Firm* — Altis Law Group, Inc.

(57) ABSTRACT

A mobile communication device (10) communicating with a communication network (20) includes a microphone (11) for receiving sounds of a user and converting the sounds into outgoing analog signals, a processor (13), a system memory (16) for storing system data from the processor, and a data converter module (12). The data converter module includes an A/D converter sub-module (120) for converting the outgoing analog signals into outgoing digital sound data; and a memory (121) for storing the outgoing digital sound data. The processor directly retrieves the outgoing digital sound data from the memory and converts the outgoing digital sound data into packets to be transmitted to the communication network.

14 Claims, 3 Drawing Sheets

MOBILE COMMUNICATION DEVICE AND POWER SAVING METHOD THEREOF

BACKGROUND

1. Field of the Invention

The invention relates to mobile communication devices, and particularly to a mobile communication device and power saving method thereof.

2. Description of Related Art

Mobile communication devices, such as, mobile phones and portable computers, have become more and more popular. Mobile phones having longer talk time and standby time are of particular interest.

Conventionally, mobile phones are either in a communication mode or a sleep mode. When a mobile phone is in a communication mode, a processor thereof saves audio data to a system memory, reads all the audio data from the system memory, and processes all the audio data in time to system clock pulses. In the process of the processor saving, reading, and processing all the audio data, the system clock pulses continue, which results in a power waste. Therefore, talk time and standby time of the mobile phone decrease.

SUMMARY

A mobile communication device communicating with a communication network includes a microphone for receiving sounds of a user and converting the sounds into outgoing analog signals, a processor, a system memory for storing system data from the processor, and a data converter module. The data converter module includes an analog to digital converter sub-module for converting the outgoing analog signals into outgoing digital sound data, and a memory for storing the outgoing digital sound data. The processor directly retrieves the outgoing digital sound data from the memory and converts them into packets to be transmitted to the communication network.

Other advantages and novel features will become more apparent from the following detailed description when taken in conjunction with the accompanying drawings.

DETAILED DESCRIPTION OF THE EMBODIMENTS

Figure 1:
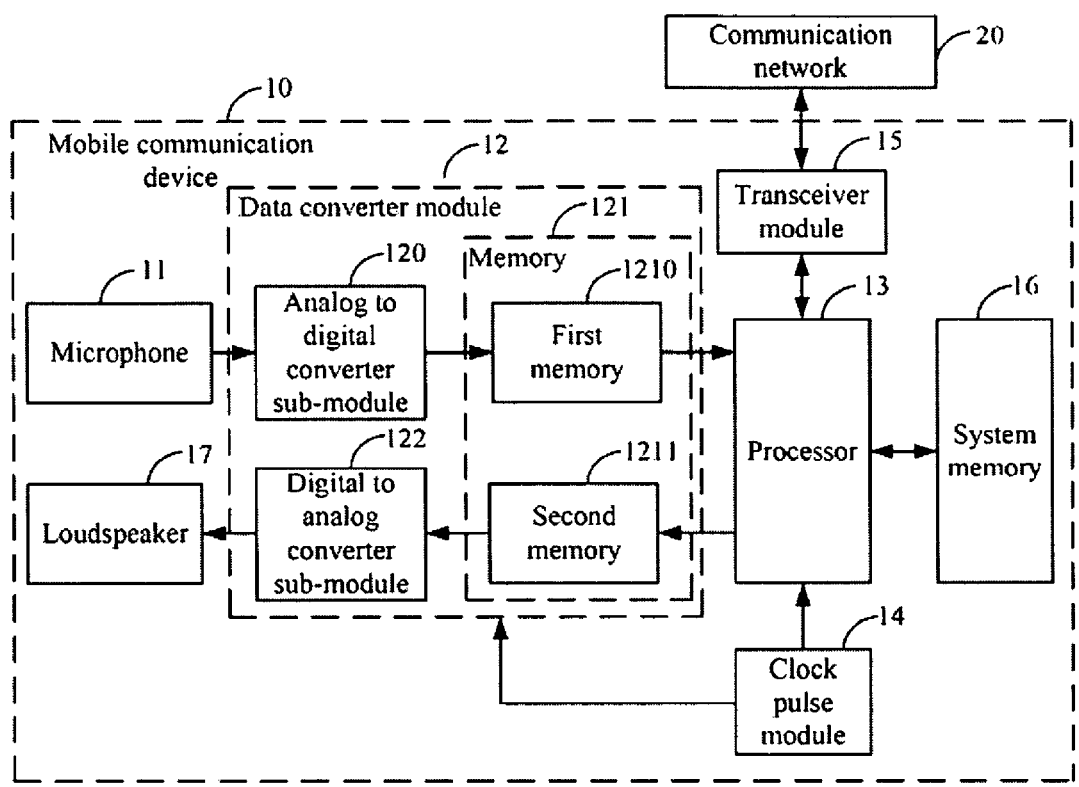
FIG. 1 is a schematic diagram of a mobile communication device of an exemplary embodiment of the invention.

FIG. 1 is a schematic diagram of a mobile communication device 10 of an exemplary embodiment of the invention. In the exemplary embodiment, the mobile communication device 10 communicates with a communication network 20, and includes a microphone 11, a data converter module 12, a processor 13, a clock pulse module 14, a transceiver module 15, a system memory 16, and a loudspeaker 17. In the exemplary embodiment, the mobile communication device 10 may be a mobile phone, and the communication network 20 may be a global system for mobile communications (GSM) network.

In the exemplary embodiment, the microphone 11 is used for receiving sounds such as voice of a user, converting the sounds to outgoing analog signals, and sending the outgoing analog signals to the data converter module 12.

The data converter module 12 communicates with the microphone 11, and is used for receiving the outgoing analog signals from the microphone 11, converting the outgoing analog signals to outgoing digital sound data, and storing the outgoing digital sound data. The data converter module 12 includes an analog to digital (A/D) converter sub-module 120, a memory 121, and a digital to analog (D/A) converter sub-module 122.

The A/D converter sub-module 120 is used for receiving the outgoing analog signals from the microphone 11, converting the outgoing analog signals to the outgoing digital sound data, and sending the outgoing digital sound data to the memory 121. The memory 121 is used for storing the outgoing digital sound data converted by the A/D converter sub-module 120, and includes a first memory 1210 and a second memory 1211.

The first memory 1210 is connected to the A/D converter sub-module 120, and is used for storing the outgoing digital sound data from the A/D converter sub-module 120. In the exemplary embodiment, the first memory 1210 may be a first in first out (FIFO) memory.

The processor 13 is connected to the first memory 1210, and is used for retrieving the outgoing digital sound data from the first memory 1210, converting the outgoing digital sound data into packets to be transmitted to the communication network 20, and sending the packets to be transmitted to the communication network 20 to the transceiver module 15.

The transceiver module 15 is used for forwarding the packets to be transmitted to the communication network 20 from the processor 13 to the communication network 20 and receiving received packets from the communication network 20. The processor 13 is further used for unpacking the received packets from the communication network 20, retrieving incoming digital sound data therefrom, and sending the incoming digital sound data to the data converter module 12.

The second memory 1211 is connected to the processor 13, and is used for storing the incoming digital sound data from the processor 13. In the exemplary embodiment, the second memory 1211 may be a FIFO memory.

The D/A converter sub-module 122 is connected to the second memory 1211, and is used for retrieving the incoming digital sound data from the second memory 1211, converting the incoming digital sound data into incoming analog signals, and sending the incoming analog signals to the loudspeaker 17.

The loudspeaker 17 is connected to the D/A converter sub-module 122, and is used for receiving the incoming analog signals from the D/A converter sub-module 122, and converting the incoming analog signals into incoming sounds.

The clock pulse module 14 is connected to the processor 13 and data converter module 12, and is used for providing system clock pulses and sleep clock pulses. In the exemplary embodiment, the system clock pulses may be high voltage signals, which are represented by "1", while the sleep clock pulses may be low voltage signals, which are represented by "0". In the exemplary embodiment, the data converter module 12 is activated by the sleep clock pulses, and the processor 13 is activated by the system clock pulses. In the exemplary embodiment, the clock pulse module 14 sends the system clock pulses to the processor 13 and the sleep clock pulses to the data converter 12 when the mobile communication device 10 is in a communication mode; the clock pulse module 14 sends the sleep clock pulses to the processor 13 when the mobile communication device 10 is in a sleep mode.

In the exemplary embodiment, the processor 13 is only active when receiving the system clock pulses, and sleep when receiving the sleep clock pulses. That is, the processor 13 retrieves the outgoing digital sound data from the first memory 1210, converts the outgoing digital sound data into the packets to be transmitted to the communication network 20, and sends the packets to be transmitted to the communication network 20 to the transceiver module 15 in time to the system clock pulses; the processor 13 also receives the received packets from the communication network 20 from the transceiver module 15, unpacks the received packets, retrieves the incoming digital sound data therefrom, and sends the incoming digital sound data to the data converter module 12 in time to the system clock pulses when the mobile communication device 10 is in the communication mode. In the exemplary embodiment, the data converter module 12 is only active under the sleep clock pulses, that is, the data converter module 12 converts the outgoing analog signals from the microphone 11 into the outgoing digital sound data, stores the outgoing digital sound data, stores the outgoing other digital sound data from the processor 13, and converts the incoming digital sound data from the processor 13 into the incoming analog signals in time to the sleep clock pulses when the mobile communication device 10 is in the communication mode.

The system memory 16 is connected to the processor 13, and is used for storing system data from the processor 13. In the exemplary embodiment, the stored system data in the system memory 16 does not include the outgoing digital sound data and the incoming digital sound data.

Figure 2:
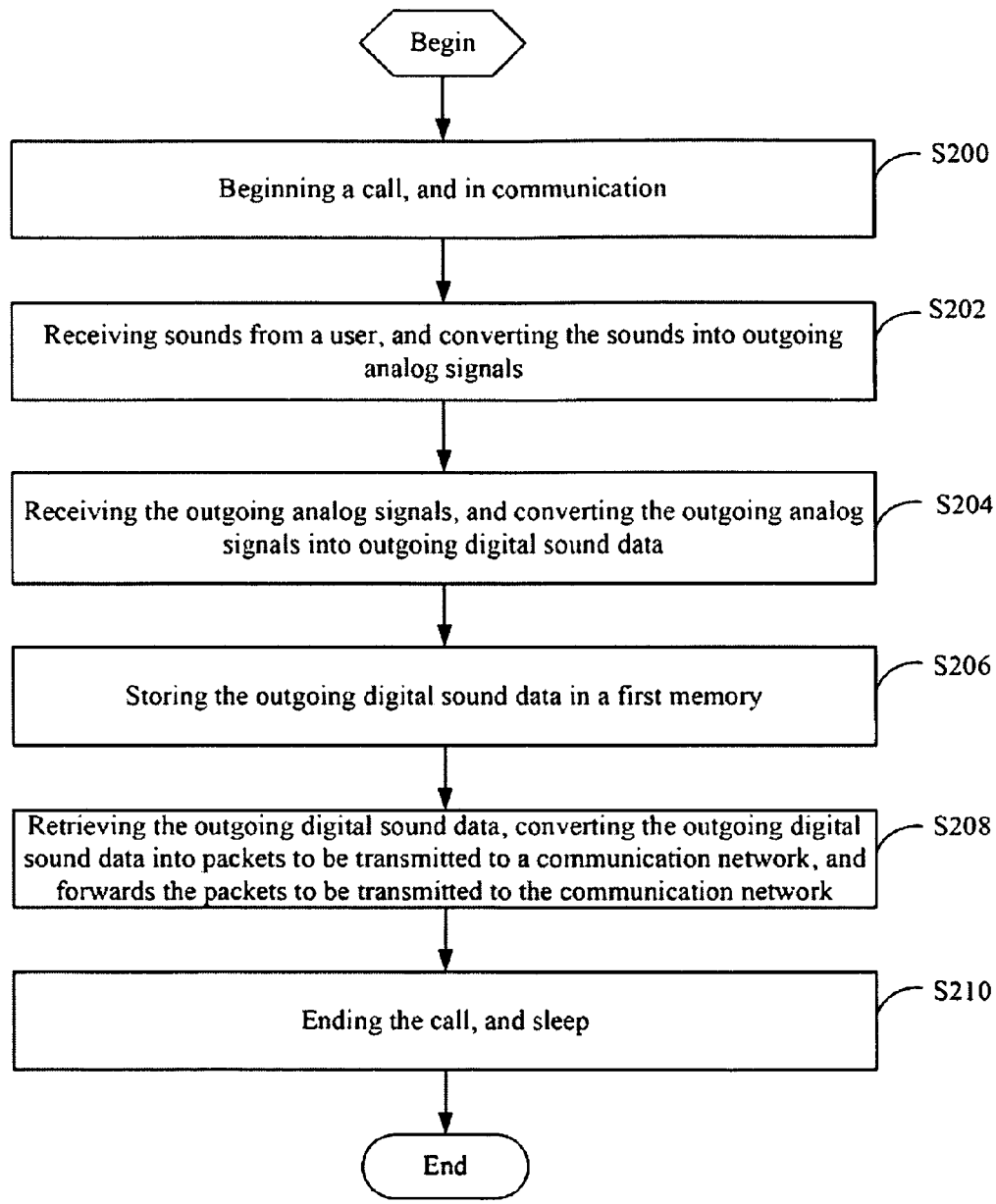
FIG. 2 is a flowchart of a power saving method of another exemplary embodiment of the invention.

FIG. 2 is a flowchart of a power saving method of an exemplary embodiment of the invention. In the exemplary embodiment, once the mobile communication device 10 receives a call or makes a call, the mobile communication device 10 is in the communication mode, otherwise, the mobile communication device 10 is in the sleep mode. In step S200, the mobile communication device 10 begins a call, and is in communication. In step S202, the microphone 11 receives sounds from a user, converts the sounds into outgoing analog signals, and sends the outgoing analog signals to the data converter module 12.

In step S204, the data converter module 12 receives the outgoing analog signals, and converts the outgoing analog signals into outgoing digital sound data. In the exemplary embodiment, after receiving the sleep clock pulses sent by the clock pulse module 14, the data converter module 12 receives the outgoing analog signals sent by the microphone 11, and converts the outgoing analog signals into the outgoing digital sound data by the A/D converter sub-module 120. In step S206, the A/D converter sub-module 120 stores the outgoing digital sound data in the first memory 1210.

In step S208, the processor 13 retrieves the outgoing digital sound data from the first memory 1210, converts the outgoing digital sound data into packets to be transmitted to the communication network 20, and forwards the packets to be transmitted to the communication network 20 to the communication network 20 via the transceiver module 15 in time to the system clock pulses. In step S210, the call ends, both the mobile communication device 10 and the processor 13 is sleep.

Figure 3:
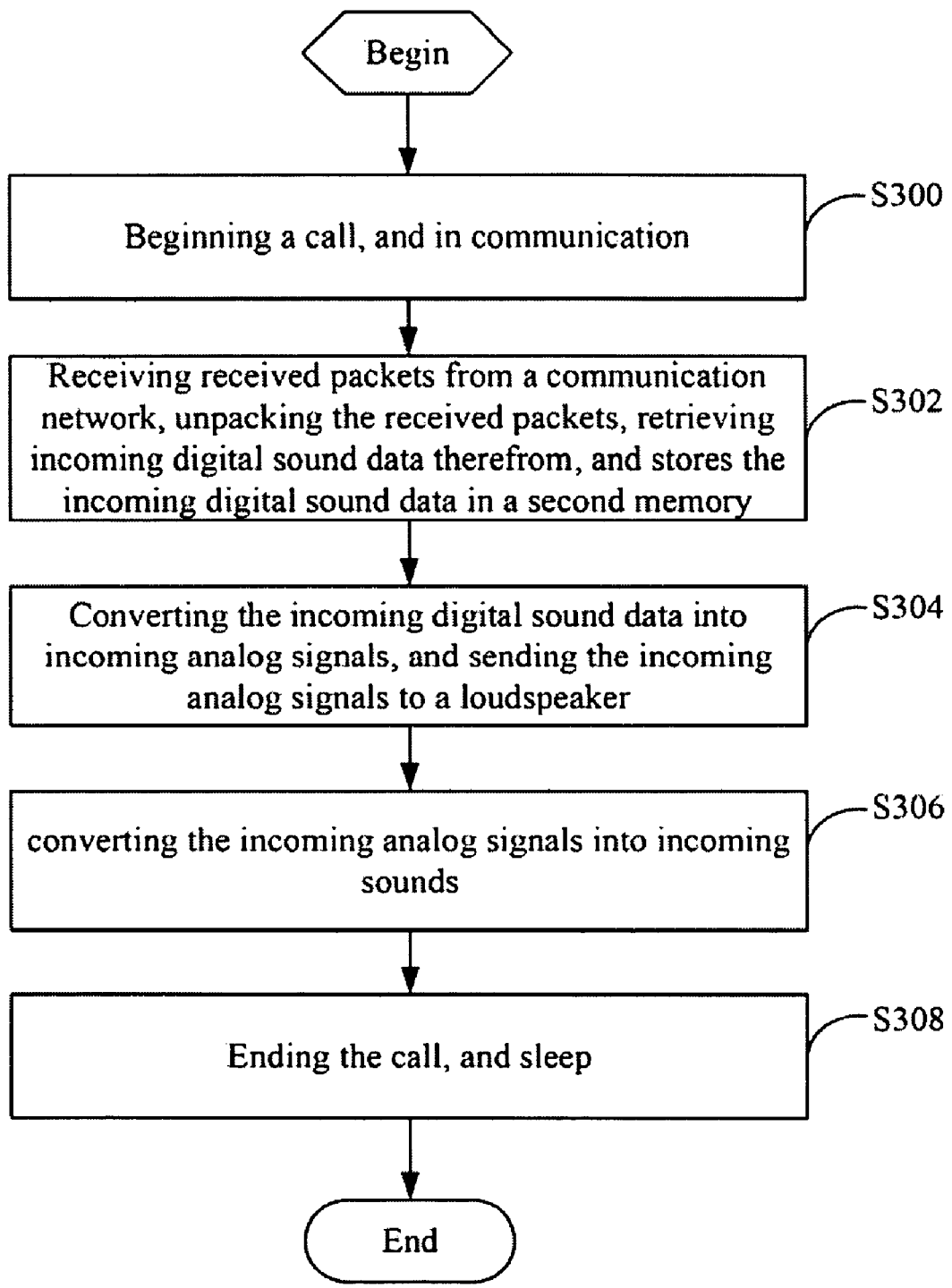
FIG. 3 is a flowchart of a power saving method of a further exemplary embodiment of the invention.

FIG. 3 is a flowchart of a power saving method of another exemplary embodiment of the invention. In the exemplary embodiment, once the mobile communication device 10 receives a call or makes a call, the mobile communication device 10 is in the communication mode, otherwise, the mobile communication device 10 is the in sleep mode. In step S300, the mobile communication device 10 begins a call, and is in communication. In step S302, the processor 13 receives received packets from the communication network 20 via the transceiver module 15, unpacks the received packets, retrieves incoming digital sound data therefrom, and stores the incoming digital sound data in the second memory 1211 in time to the system clock pulses.

In step S304, the D/A converter sub-module converts the incoming digital sound data into incoming analog signals, and sends the incoming analog signals to the loudspeaker 17 in time to the sleep clock pulses. In step S306, the loudspeaker 14 receives the incoming analog signals, and converts the incoming analog signals into incoming sounds. In step S308, the call ends, both the mobile communication device 10 and the processor 13 is sleep.

The mobile communication device 10 and the power saving method thereof makes the processor 13 directly retrieves the outgoing and incoming digital sound data from the memory 121 other than the system memory 16, therefore, times spent on digital sound data processed by the processor 13 are reduced, which finally results in power saving.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A mobile communication device communicating with a communication network, the mobile communication device comprising a microphone for receiving sounds of a user and converting the sounds into outgoing analog signals, a processor, and a system memory for storing system data from the processor, wherein the mobile communication device further comprises a data converter module comprising:
   an analog to digital converter sub-module, for converting the outgoing analog signals into outgoing digital sound data; and
   a memory, for storing the outgoing digital sound data;
   wherein the processor directly retrieves the outgoing digital sound data from the memory and converts the outgoing digital sound data into packets to be transmitted to the communication network;
   the mobile communication device further comprising a pulse module, for providing system clock pulses and sleep clock pulses;
   wherein the clock pulse module provides the system clock pulses to activate the processor and the sleep clock pulses to activate the data converter module when the mobile communication device is in a communication mode; and provides the sleep clock pulses to the processor to make the processor sleep when the mobile communication device is in a sleep mode.

2. The mobile communication device of claim 1, wherein the memory comprises a first memory for storing the outgoing digital sound data.

3. The mobile communication device of claim 2, wherein the first memory is a first in first out (FIFO) memory.

4. The mobile communication device of claim 1, further comprising a transceiver module for forwarding the packets to be transmitted to the communication network converted by the processor to the communication network.

5. The mobile communication device of claim 1, wherein the transceiver module is further used for receiving received packets from the communication network.

6. The mobile communication device of claim 5, wherein the processor is further used for unpacking the received packets and retrieving incoming digital sound data therefrom.

7. The mobile communication device of claim 6, wherein the memory comprises a second memory for storing the incoming digital sound data.

8. The mobile communication device of claim 7, wherein the second memory is a first in first out (FIFO) memory.

9. The mobile communication device of claim 7, wherein the data converter module further comprises a digital to analog converter sub-module for retrieving the incoming digital sound data from the second memory and converting the incoming digital sound data into incoming analog signals.

10. The mobile communication device of claim 9, further comprising a loudspeaker, for converting the incoming analog signals into incoming sounds.

11. A power saving method, utilized by a mobile communication device communicating with a communication network, the mobile communication device comprising a microphone, a data converter module, a processor, a system memory, and a loudspeaker, the method comprising the steps of:

converting sounds of a user into outgoing analog signals by the microphone;

after receiving sleep clock pulses, converting the outgoing analog signals into outgoing digital sound data by the data converter module;

storing the outgoing digital sound data in a first memory of the data converter module by the data converter module;

directly retrieving the outgoing digital sound data from the first memory, and converting the outgoing digital sound data into packets to be transmitted to the communication network by the processor in time to system clock pulses;

forwarding the packets to be transmitted to the communication network to the communication network; and the mobile communication device and the processor sleep in time to the sleep clock pulses when a call ends.

12. The power saving method of claim 11, further comprising:

receiving received packets from the communication network;

unpacking the received packets and retrieving incoming digital sound data therefrom;

storing the incoming digital sound data in a second memory of the data converter module;

retrieving the incoming digital sound data from the second memory, and converting the incoming digital sound data into incoming analog signals; and converting the incoming analog signals into incoming sounds.

13. A mobile communication device signally communicating with a communication network, comprising:

a processor signally communicating with said communication network to pack outgoing digital sound data into packages to be transmitted to said communication network and to unpack received packages from said communication network into incoming digital sound data in time to system clock when the mobile communication device in communication; and a data converter module signally connected with said processor, and used to convert user's sound signals into said outgoing digital sound data and to convert said incoming digital sound data into sound signals for users to hear, said data converter module comprising at least one memory signally connected with said processor to store at least one of said outgoing digital sound data and said incoming digital sound data therein before said processor retrieves said outgoing digital sound data from said data converter module and after said processor transmits said incoming digital sound data to said data converter module in time to sleep clock pulses when the mobile communication device in communication.

14. The mobile communication device of claim 13, wherein said data converter module comprises an analog to digital (A/D) converter sub-module to convert said user's sound signals into said outgoing digital sound data and a digital to analog (D/A) converter sub-module to convert said incoming digital sound data into said sound signals for users to hear, said at least one memory is signally connected between said processor and at least one of said A/D converter sub-module and said D/A converter sub-module.

* * * * *